United States Patent

Norwich

[15] 3,646,434
[45] Feb. 29, 1972

[54] STANDARDIZATION OF DIELECTRIC MATERIALS GAUGES HAVING CAPACITIVE PROBES WITH REMOTELY CONTROLLED BALANCING CIRCUITS USING VARACTORS

[72] Inventor: Alan Norwich, Columbus, Ohio
[73] Assignee: Industrial Nucleonics Corporation
[22] Filed: Nov. 12, 1969
[21] Appl. No.: 875,776

Related U.S. Application Data

[63] Continuation-in-part of Ser. No. 634,261, Apr. 27, 1967, abandoned.

[52] U.S. Cl. .......................................................... 324/61 R
[51] Int. Cl. ........................................................ G01n 27/26
[58] Field of Search ................ 324/60, 61; 317/246; 340/186

[56] References Cited

UNITED STATES PATENTS

| | | | |
|---|---|---|---|
| 3,159,786 | 12/1964 | Bayne | 324/60 |
| 3,177,427 | 4/1965 | Kuntz et al | 324/61 |
| 3,286,171 | 11/1966 | Fluegel et al | 324/60 |
| 3,350,701 | 10/1967 | Bell | 340/186 |
| 3,443,219 | 5/1969 | Adams | 324/61 |

*Primary Examiner*—Edward E. Kubasiewicz
*Attorney*—Lowe & King, William T. Fryer, III and C. Henry Peterson

[57] ABSTRACT

Disclosed is a system for measuring moisture content of a sample with a capacitive probe wherein a voltage controlled, semiconductor capacitor is employed for balancing out the probe capacitance when the probe is removed from the sample. The amount of unbalance produced by the presence of the sample is used as a measure of the moisture content. The probe, capacitor and a phase inverting means are mounted in a head positioned in proximity to the sample. At a remote location from the head and sample, AC and DC power sources are provided for exciting the probe and controlling the capacity of the variable capacity semiconductor, respectively. Monitoring means for variable signals derived from the capacitance measuring means is provided. Balance is attained manually or automatically, according to different embodiments. In automatic balancing, the probe output is modulated with a predetermined frequency which is phase detected to control the amplitude of the voltage applied to the semiconductor capacitor.

41 Claims, 7 Drawing Figures

INVENTOR
ALAN NORWICH
BY
ATTORNEY

STANDARDIZATION OF DIELECTRIC MATERIALS GAUGES HAVING CAPACITIVE PROBES WITH REMOTELY CONTROLLED BALANCING CIRCUITS USING VARACTORS

The present application is a continuation in part of my copending application, Ser. No. 634,261, filed Apr. 27, 1967, Remotely Controlled Balancing Circuit Using Varactors For Dielectric Material Gauges Having Capacitive Probes, now abandoned.

The present invention relates generally to admittance gauging systems and methods employing probes and more particularly to a system for and method of balancing and/or standardizing a probe of an admittance gauge.

Measuring the admittance properties, e.g., moisture content, of a sample, such as a proper web during the manufacturing process, by capacitive means is well known in the art. One type of gauge for monitoring admittance comprises a capacitive probe that is connected in a bridgelike circuit with a balancing capacitor. Terminal points on the bridge connected to opposite electrodes of the balancing capacitor and moisture monitoring capacitance probe are excited with out-of-phase AC voltages. Typically, the value of the balancing capacitor is adjusted at a time while no sample, and only air, is being sensed by the probe. The balancing capacitor is adjusted so that a zero amplitude AC voltage is derived at a common terminal between the capacitive probe and the balancing capacitor.

Capacitive moisture measuring gauges are often located remotely from equipment for monitoring the variable capacity of the sample and from power sources utilized for supplying AC excitation voltage for the bridge. The gauge station is preferably removed a relatively great distance from the control and power station because a large number of gauges are usually constantly monitored at the same control station and the requirement for maintaining the monitoring apparatus under a controlled environment.

It is desirable for the balancing capacitor to be physically located at the gauge or monitoring station because a phase inverting device for the AC power supplied to the bridge, such as an amplifier or transformer, must be in proximity to the capacitive measuring probe. Proximity between the capacitive measuring probe and the phase inverter is sought because the lengthy cables between the power source and the monitoring or measuring station can introduce phase shifts in the AC excitation voltage applied to the balancing and measuring capacities. If the voltages applied across the measuring and balancing capacities are not exactly 180° displaced in phase from each other, erroneous results occur in the moisture indicating signals derived at the common terminal between the two capacities.

Because the capacitance of the probe is subject to change as a function of temperature, humidity, electrode wear, etc., it is occasionally necessary to change the value of the balancing capacitor to maintain the system in a balanced condition. In the prior art, the balancing capacitor is a conventional variable plate device that must be adjusted by hand at the location where the monitoring probe is positioned. Hence, it is necessary for personnel periodically to adjust the value of the balancing capacitor at the moisture gauge site. Of course, such a procedure is time consuming, hence, expensive, and in many cases is not performed in a facile manner since the balancing capacitor is located in a remote, not easily reached, place.

According to the present invention, a voltage controlled, variable capacity semiconductor diode or varactor is provided at the probe location in the balancing capacitor circuit. The semiconductor capacitor is connected with a DC source at a control station through the same cable link as connects the capacitive gauge with the AC source and the monitoring or readout means. Since all of the balancing capacitors on each of the moisture gauges in an entire installation are connected with a separate DC source at a central location, the prior art requirement for personnel to inspect each gauge at the gauge site is obviated.

Typically, the probe capacity has a value of approximately 1 picofarad. The usual values of voltage controlled semiconductor capacitors, however, are generally on the order of 7 to 100 pf. at 4 volts bias, for example. Hence, to achieve a balance whereby a zero voltage is derived at the junction between the measuring probe and the balancing capacitor during the balancing operation, the AC voltage applied to the balancing capacitor must be considerably less than the AC voltage applied to the probe. According to one embodiment of the invention, the applied voltage to the balancing capacitor is reduced appropriately with a capacitive voltage divider, while in a second embodiment the excitation voltage is reduced by utilizing a scale factor changing amplifier circuit.

A problem incident with the use of variable capacity semiconductors is that the AC excitation voltage has a tendency to modulate the capacitor value. According to a further feature of the present invention, the tendency of the applied excitation voltage to vary the capacitance value of the balancing capacitor is virtually obviated by using a pair of capacitive diodes as the variable capacitors. The diodes are connected in back-to-back relationship and DC bias voltage is connected to the common terminal thereof, at the cathode of each, for controlling the capacity value. Since the capacitive diodes are connected in back-to-back relationship, the excitation voltage changes their capacitances differentially, whereby the total series capacity introduced by them remains constant through a complete cycle of the AC excitation voltage. According to another aspect of the invention the AC modulation effects are reduced with the same voltage division techniques employed for reducing the effective value of the semiconductor capacitor.

In several of the embodiments of the invention, the balancing operation is manually performed from the remote location while in other embodiments it is achieved automatically with apparatus provided at the remote location. The gauge is automatically balanced by a variable DC level and a relatively low amplitude, low-frequency AC component on a high-frequency AC excitation voltage for the bridge. The response of the bridge to the DC level and low-frequency component is sensed with a synchronous detector responsive to the phase of the low-frequency component. The detector controls the magnitude of the DC voltage applied to the bridge, which in turn varies the capacitance of the capacitive diode to achieve balance. The synchronous detector has a sufficiently long time constant so as to be unresponsive to the low-frequency AC components derived from the bridge since it includes a DC motor as an integrating element. The DC motor is activated in response to the phase displacement between the low-frequency component of the bridge output and a reference phase at the low frequency and drives a potentiometer slider controlling the DC voltage level applied to the bridge.

According to another feature of the invention, the capacitive gauge is standardized by adjusting the relative amplitudes of the voltages of high- and low-frequency sources driving the probe. Standardization is automatically performed in response to signals derived from substantially the same circuitry as is employed for probe balancing and occurs immediately before or after probe balancing while no sample other than air is being measured by the probe. The gauge is periodically standardized to compensate for changes, due to drift of electrical circuits associated with detecting channels separately responsive to the high- and low-frequency sources.

It is, accordingly, an object of the present invention to provide a new and improved system for and method of varying the value of the balancing capacitor in an admittance gauge having a capacitive probe.

A further object of the invention is to provide a new and improved system for and method of balancing and/or standardizing an admittance gauge having a capacitive probe.

Another object of the present invention is to provide a new and improved system and method wherein the value of the balancing capacitor in an admittance gauge having a capacitive probe is varied from a remote location electrically.

An additional object of the present invention is to provide an admittance gauge having a capacitive probe, wherein a voltage controlled semiconductor capacitor is utilized as a balancing capacitor and the effective value of the balancing capacitor is reduced to equal approximately the capacitance of the gauge loaded only by air.

A further object of the present invention is to provide an admittance gauge having a capacitive probe and utilizing a voltage controlled semiconductor capacitor as a balancing capacitor wherein the tendency of an AC excitation source modulating the semiconductor capacity is compensated.

Still another object of the invention is to provide a new and improved balancing circuit and method for an admittance gauge having a capacitive probe wherein the gauge is automatically balanced.

The above and still further objects, features, and advantages of the present invention will become apparent upon consideration of the following detailed description of several specific embodiments thereof, especially when taken in conjunction with the accompanying drawings, wherein.

Figure 1:
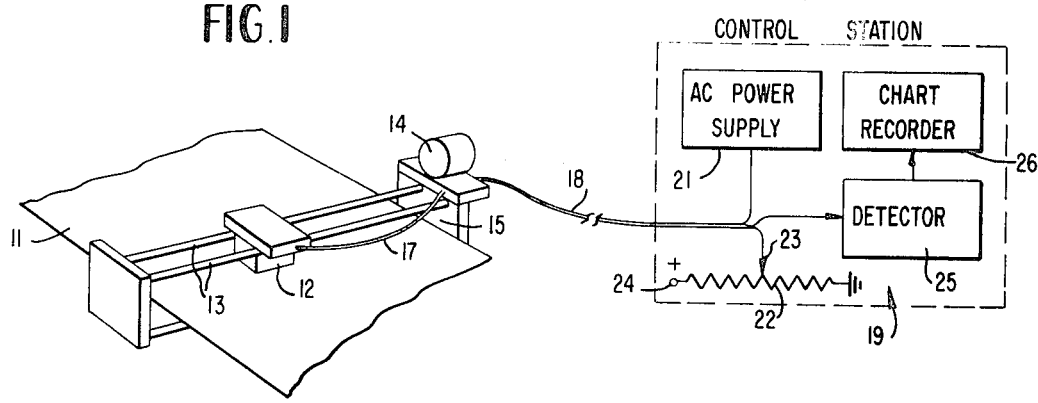
FIG. 1 is a view illustrating a typical moisture measuring gauge installation adapted to utilize the present invention.

Reference is now made to FIG. 1 of the drawings wherein the admittance properties of a material in the form of paper web 11 are monitored to determine moisture content during the manufacturing process thereof by capacitive moisture-measuring gauge 12.

Moisture-measuring gauge 12 is scanned transversely of web 11 along rails 13 by motor 14, mounted on standard 15. Electric power and signals are coupled between terminal block 16 on standard 15 and probe 12 by cable 17. Terminal block 16 is connected via a relatively long cable 18 to a control area of station 19.

In an actual papermaking mill, a multiplicity of moisture-measuring gauge stations, such as the one illustrated in FIG. 1, are provided. Each of the gauging stations is connected to control station 19 via a separate cable 18, whereby control and readout from each of the moisture gauge stations are accomplished from a single central location. Because of the relatively large distances between different ones of the moisture measuring stations, cable 18 is relatively long in many instances, frequently having a length on the order of 500 feet.

Any precise phase changing elements associated with the capacitive probe 12 must be located at the probe site because of the possibility of phase shifts introduced via the cable either between the probe site and the end of the transversing mechanism or the control station 19. For this reason the entire balancing circuit is carried by the housing to which probe 12 is attached.

Control station 19 includes an AC power supply 21 which preferably derives a pair of frequencies utilized to excite capacitive probe 12. The frequencies generated by power supply 21 generally have a ratio on the order of 10 to 1 and may range anywhere from 1 kHz. to 1MHz., for example the frequencies may be 1 kHz. and 10 kHz., 10kHz. and 100 kHz., or 100kHz. and 1 MHz.

Control area 19 also includes a DC power supply including potentiometer 22 having tap 23. Potentiometer 22 is connected between a positive DC voltage source at terminal 24 and ground. The voltage derived from tap 23 of potentiometer 22 is utilized for controlling the capacitive value of a voltage-controlled balancing capacitor included within probe 12.

To facilitate monitoring each of the gauge stations, cable 18 includes a pair of leads for exciting amplitude detector circuitry 25. Detector 25 derives a DC voltage indicative of the moisture content of web 11, as measured by each gauge in the installation, such as gauge 12. The output of each detector activates strip chart recorder 26 to provide a visual readout of the moisture at each of the gauges in the installation.

Figure 2:
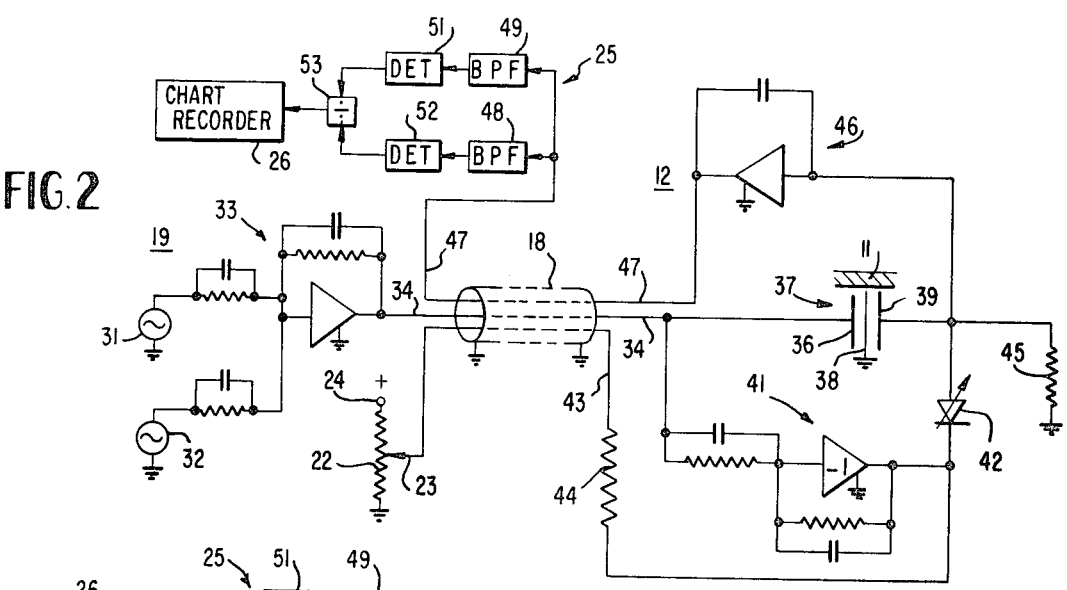
FIG. 2 is a circuit diagram of one embodiment of the present invention.

Reference is now made to FIG. 2 of the drawings wherein there is illustrated one embodiment of the circuitry utilized for energizing a capacitive probe and for performing a balancing operation on the probe fringe capacitance, in combination with the circuitry utilized for power supply 21 and detector 25 at control area 19. Power supply 21 includes oscillators 31 and 32, which in a typical embodiment have frequencies of 100 kHz. and 1 MHz., respectively, and peak-to-peak amplitudes of 60 volts. The AC output voltages of oscillators 31 and 32 are linearly combined in summing amplifier 33, having an output feeding gauge 12 via lead 34 in cable 18. Cable 18 also includes signal carrying lead 47, as well as outer shield 35, that is grounded at control station 19 and gauge 12. The composite AC voltage on lead 34 is applied to "transmitting" electrode 36 of capacitive moisture measuring probe 37.

Capacitive moisture measuring probe 37 is of the conventional prior art type, and in addition to electrode 36, includes a centrally located grounded shield plate 38 and a edges receiving" electrode 39. Web 11 is in the fringing field between electrodes 36 and 39, passing along the edges of the electrodes, whereby in a typical example a capacity of 1 picofarad exists between electrodes 36 and 39 if only air is in the fringing field between the electrodes. As a paper web 11 being monitored passes through the fringing field between electrodes 36 and 39, the impedance between these electrodes varies and a significant change in the current coupled to receiver electrode 39 occurs. The impedance between each of electrodes 36 and 39 and shield plate 38 is not affected to a great degree by web 11 and can be considered as remaining relatively constant, with a capacity having a value of approximately 160 picofarads.

To provide a zero voltage to ground from receiver electrode 39 when no paper passes through the fringing field between electrodes 36 and 39, and air loads the electrodes with approximately 1 picofarad capacity during the balancing operation, capacitor 37 is connected in a bridgelike network. The bridgelike network is excited by the AC voltage on lead 34, as coupled to probe 12 through cable 18. The AC voltage on lead 34 is changed in phase 180° by phase inverting amplifier 41, having a gain of −1. The output voltage of amplifier 41, equal in amplitude but 180° out-of-phase from the voltage applied to electrode 36, is applied to variable balancing capacitor 42.

Balancing capacitor 42 is a semiconductor diode having its cathode connected through to the output of amplifier 41 and its anode connected to electrode 39 of moisture monitoring capacitive probe 37. The capacity of variable capacitor diode 42, frequently referred to in the art as a varactor, is controlled in response to the back bias, positive voltage applied to its cathode. With changing reverse biases applied to the cathode of diode 42, the width of the diode depletion region is changed. Since the depletion region functions as a dielectric between the diode anode and cathode, different capacities are established between the diode terminals merely by changing the DC back bias applied to the diode cathode.

Variable back biasing of diode 42 is established with potentiometer 22, at control station 19. The positive voltage at tap 23 of potentiometer 22 is fed via lead 43 through cable 18. Lead 43, at gauge 12, is connected to the cathode of diode 42, thereby to back bias the diode and establish a capacity between its electrodes in accordance with the voltage of slider 23. Since diode 42 is back biased, hence draws virtually zero DC current, resistor 44, having a relatively large value, is connected between the diode cathode and the slider 23. Resistor 44 decouples the high-frequency output of amplifier 41 from ground regardless of the setting of slider 23, to maintain the equal amplitude and opposite phase conditions for the AC voltage applied across the input terminals of the bridgelike network including capacitors 37 and 42.

To provide a return bias path for the DC current from tap 23 through capacitive diode 42 and to establish a load voltage for the AC signal developed at receiving electrode 39, resistor 45 is connected between the common terminal of capacitors 37 and 42 to ground. The signal developed at this common terminal has a first component resulting from the current through the probe 37 and a second component resulting from the current through balancing capacitive diode 42. The two current components are oppositely phased because of the oppositely phased driving voltages, and hence the net current supplied to the common terminal through the probe and the diode is equal to the difference between the currents through these two circuit elements. When the bridgelike network is balanced so that equal AC currents flow through the probe 37 and the diode 42, the net current into the common terminal is zero and no signal appears across resistor 45. As described hereinafter, the bridgelike network is balanced, making the two signal components equal, when the probe is displaced from the material and thereby electrically decoupled therefrom by translating the probe to an off-sheet position.

Thereafter when the probe is translated back on sheet adjacent to the material, the electrical coupling of the probe thereto causes the probe impedance to decrease, whereby the AC current through the probe becomes larger than the oppositely phased AC current through the capacitive diode 42. The net current fed to the common terminal results in an AC difference voltage which appears across resistor 45 and which is amplified and utilized to provide a measure of the moisture content of web 11. The AC voltage developed across resistor 45 is amplified by a predetermined factor in AC feedback amplifier 46, included within probe 12. The gain of amplifier 46 is preselected so that the output signal thereof is of sufficiently high level as not to be affected adversely by spurious noise that might be introduced in propagating through cable 18 back to control station 19. In addition, the signal amplitude derived from amplifier 46 is of sufficiently large amplitude that attenuation introduced by cable 18 is not severe enough to prevent detection at the remotely located control station.

Detector 25, at control station 19, includes a pair of bandpass filters 48 and 49, having center frequencies coincident with the frequencies of oscillators 31 and 32, respectively. Filters 48 and 49 have sufficiently high Q's to discriminated one frequency against the other, whereby the output signals thereof include frequency components of only one of the oscillators. The AC outputs of filters 48 and 49 are applied to amplitude detectors 51 and 52, respectively, the outputs of which are compared in a suitable network, such as analog ratio computer circuit 53. Comparator circuit 53 derives a DC voltage commmensurate with the moisture content of web 11 as it passes between electrodes 36 and 39. The voltage indicative of moisture content is applied to the drive motor, not shown, for the pen of chart recorder 26, whereby a visual, permanent record of the moisture content of web 11 is derived.

For optimum and most accurate performance of the monitoring equipment, it is preferable that the capacity between electrodes 36 and 39 during the balancing operation while only air in is the fringing field between the electrodes be substantially equal to the capacity of balancing capacitor 42, whereby a zero voltage is applied across resistor 45 when paper is not in the fringing field. Adjusting the value of the balancing capacitor 42 is accomplished by translating probe 12 to an off sheet position. With probe 12 at a position removed from web 11, the slider of potentiometer 22 is adjusted until the recorded signal has a zero value. Because the recorder and capacitor control are at the same location, station 19, remote from the plurality of monitoring stations where gauges 12 are located, balancing the gauge is accomplished in a facile manner.

While the system of FIG. 2 enables a balance to be achieved theoretically, it suffers from two practical problems. In particular, the values of typical presently available varactors are on the order of five or six times greater than the capacity between electrodes 36 and 39 when air is the only dielectric in the fringing field. Generally, the air dielectric between electrodes 36 and 39 has a capacity on the order of 1 picofarad while presently available varactors exhibit linear voltage versus capacitance characteristics centered about 5 picofarads. Hence if the balancing circuit amplifier 41 has unity gain as illustrated, the balancing current through capacitive diode 42 will be five times as large as the current through probe 37, and the bridgelike circuit cannot be balanced. Arrangements such as those described hereinafter must therefore be made to suitably proportion the balancing signal component so as to make it approximately equal to the probe signal component when air is the only dielectric in the fringing field of the probe. A second problem with the circuit of FIG. 2 is that the relatively large 80 volt peak-to-peak AC voltage that might be applied across diode 42 is sufficiently large to change the capacitive value of the diode materially. It is to be understood that diode 42 is subject to 80 volt peak-to-peak swings because each of sources 31 and 32 has a 40 volt peak-to-peak output.

Figure 3:
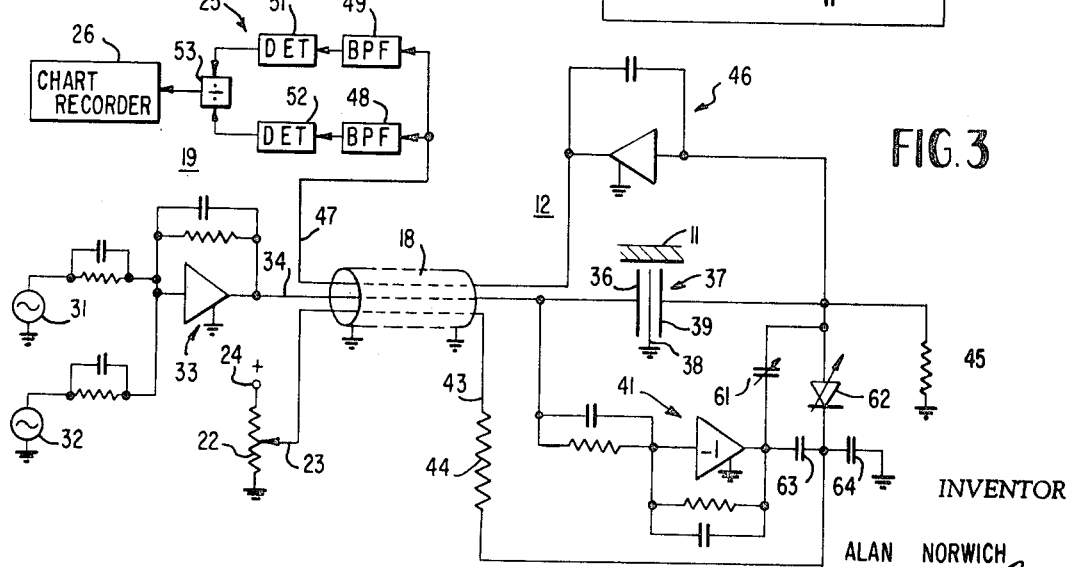
FIG. 3 is a circuit diagram of a further embodiment of the present invention, wherein the AC voltage applied to the semiconductor capacitor is reduced by capacitive means.

To overcome these two problems, the circuit of FIG. 3 can be utilized. In the circuit of FIG. 3, gauge 12 includes manually adjusted, variable coarse balancing capacitor 61, connected between the output of amplifier 41 and load resistor 45. Coarse balancing capacitor 61 is adjusted so that is has a nominal capacity equal to approximately one-half the capacity between electrodes 36 and 39 for air as the only fringing field dielectric.

Connected in shunt circuit with balancing capacitor 61 is varactor 62, energized by the AC output of amplifier 41 through the capacitive voltage divider comprising series connected capacitors 63 and 64. To the tap between capacitors 63 and 64, the DC control voltage at tap 23 of potentiometer 22 is fed via coupling resistor 44.

The voltage divider comprising capacitors 63 and 64 reduces the effective capacity, $C_{eff}$, of varactor 62, as seen by coarse balancing capacitor 61, in accordance with:

$$C_{eff} = C_s \cdot C_1/(C_1+C_2) \qquad (1);$$

where:

$C_s$ is the capacity of varactor 62;

$C_1$ is the value of capacitor 63; and $C_2$ is the value of capacitor 64.

By selecting the values of capacitors 63 and 64 appropriately, the effective capacity of varactor 62 can be reduced by a factor on the order of 10, whereby the combined capacities of coarse balancing capacitor 61 and varactor 62 have a value centered about 1 picofarad. To change the capacity of varactor 62, the setting of slider 23 is adjusted whereby the maximum and minimum values of the balancing capacitor can vary between approximately 0.85 and 1.15 picofarads. The 0.85 to 1.15 picofarad range is adequate for balancing the air capacity of most gauges under expected ambient conditions.

The voltage divider comprising capacitors 63 and 64 has the added advantage of reducing the capacity modulation effects of the output of amplifier 41. If the peak-to-peak output voltage of amplifier 41 is considered as E, the AC voltage, $e$, applied across varactor 62, is reduced by a factor on the order of 10 by reducing the effective capacity of the varactor. This is seen from:

$$e = E \times C_1/(C_1+C_2) \qquad (2).$$

Figure 4:
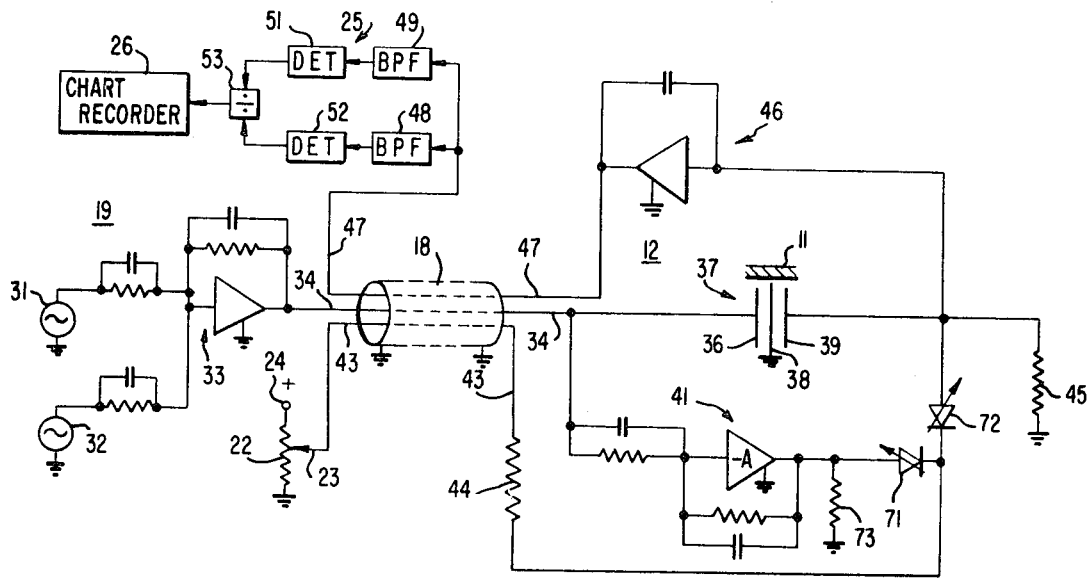
FIG. 4 is a circuit diagram of still another embodiment of the present invention wherein a pair of back-to-back semiconductor, variable capacity diodes are employed.

A further system for effectively reducing the value of the varactor capacity while overcoming the modulation effects of the AC voltage is disclosed by the circuit of FIG. 4. In the circuit of FIG. 4, varactor 42, FIG. 2, is replaced with a pair of back-to-back varactors 71 and 72, wherein the anode of varactor 71 is connected to be responsive to the output voltage of amplifier 41 and the anode of varactor 72 is connected to the junction between electrode 39 and resistor 45. Varactors 71 and 72 are back biased by the voltage at tap 23 of potentiometer 22 by connecting the common thermal between the cathodes thereof to resistor 44 through lead 43 and the anodes thereof to ground through resistors 73 and 45, respectively.

For typical varactors having values of 5 picofarads as average values of their linear voltage versus capacity variations, the gain of amplifier 41 is selected so that the voltage applied to the anode of varactor 71 is a factor 1/2.5 less than the voltage applied to electrode 36 of the capacitive probe 37. By selecting the gain of the amplifier 41 to equal 2/5, the effective capacity of varactors 71 and 72 in the bridge circuit is 1 picofarad. The 1 picofarad value for varactors 71 and 72 is established because the average combined series connected value thereof is approximately 2.5 picofarads. Since varactors 71 and 72 are driven with a voltage that is out-of-phase with, but less than the voltage driving electrode 36 by a factor of 1/2.5, the voltage across resistor 45 is zero if a 1 picofarad capacity exists between electrodes 36 and 39.

The circuit of FIG. 4 causes the modulation effects of the capacities of varactors 71 and 72 to be decreased for two reasons. In particular, the reduced AC voltage applied by the output of amplifier 41 causes a reduction in the capacity modulation effects on varactors 71 and 72. In addition, the AC output voltage of amplifier 41 differentially changes the capacities of varactors 71 and 72 since the varactors are connected in back-to-back relationship with the amplifier output. Because of the differential effect of the output of the amplifier 41 on the capacitive values of varactors 71 and 72, the combined capacity between the anodes of the two varactors remains relatively constant.

While the AC voltage applied to varactors 71 and 72 by amplifier 41 has a tendency to maintain the combined varactor capacitive values constant, changes in the value of the DC voltage at tap 23 alter the capacitive values of the varactors in the same direction. The DC voltage applied to the cathodes of varactors 71 and 72 change their capacitance values in the same direction because the varactors are, in effect, connected in parallel with the DC source. In contrast, the varactors are connected in series with the output of amplifier 41.

Figure 5:
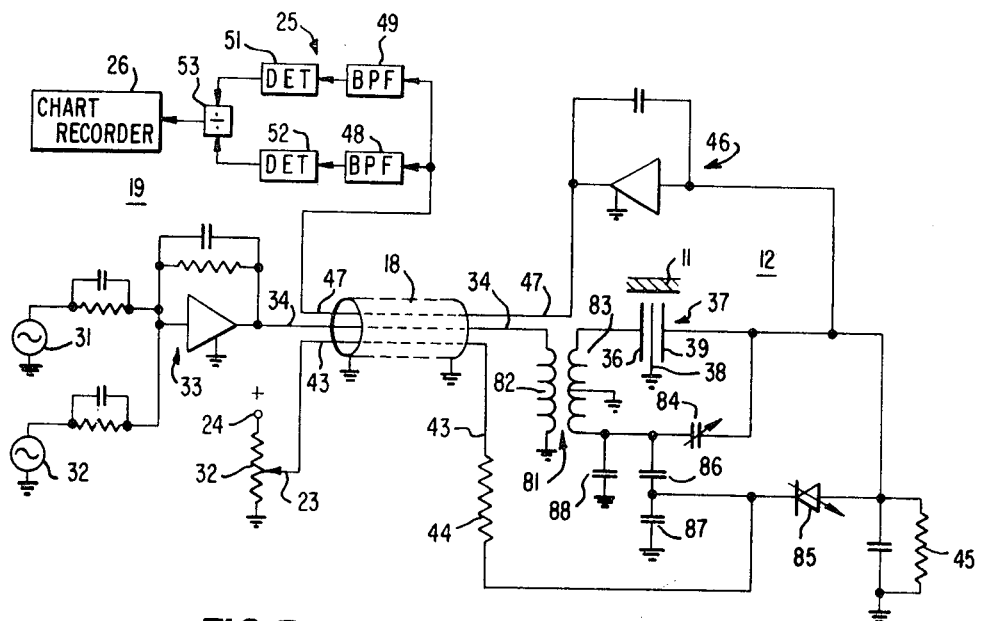
FIG. 5 is a circuit diagram of still another embodiment of the present invention wherein a transformer is utilized for phase inverting purposes.

A further embodiment of the present invention is disclosed by FIG. 5. In FIG. 5, the function of inverting amplifier 41 is replaced by transformer 81, located physically within gauge 12. Primary winding 82 of transformer 81 is connected between ground and the output terminal of amplifier 33 via lead 34 within cable 18. Secondary winding 83 of transformer 81 is center tapped, with one of its ends being connected directly to drive transmitting electrode 36 of monitoring capacitive probe 37. The other end of secondary winding 83 is connected to one electrode of coarse balancing capacitor 84, which functions in precisely the same manner as coarse balancing capacitor 61, FIG. 3. The remaining electrode of coarse balancing capacitor 84 is connected to the junction between electrode 39 and resistor 45.

Varactor 85 is connected via lead 43 within cable 18 to be responsive to the DC voltage at tap 23. Reduction in the effective capacity of varactor 85 and the AC voltage applied across the varactor is accomplished by connecting a voltage divider including capacitors 86 and 87 between the junction of capacitor 84 with secondary winding 83 and ground. The voltage divider comprising series connected capacitors 86 and 87 has a tap connected to the cathode of varactor diode 85. The values of capacitors 86 and 87 are sufficiently small relative to the other components in the circuits so that the amplitude and phase of the AC voltages derived at the opposite ends of secondary winding 83 are of equal amplitude and 180° phase shifted relative to each other.

To maintain balance between the voltages at both ends of secondary winding 83, however, 160 picofarad capacitor 88 is connected in shunt with the voltage divider comprising capacitors 86 and 87. Capacitor 88 is required to compensate for the 160 picofarad capacity between electrode 36 and grounded shield 38 within capacitive measuring probe 37. Since web 11 does not generally introduce a capacity between electrode 36 and shield 38 of more than 0.5 picofarads, it is not necessary to constantly change the value of capacitor 88 with variations in the properties of web 11 in order to maintain balance.

Figure 6:
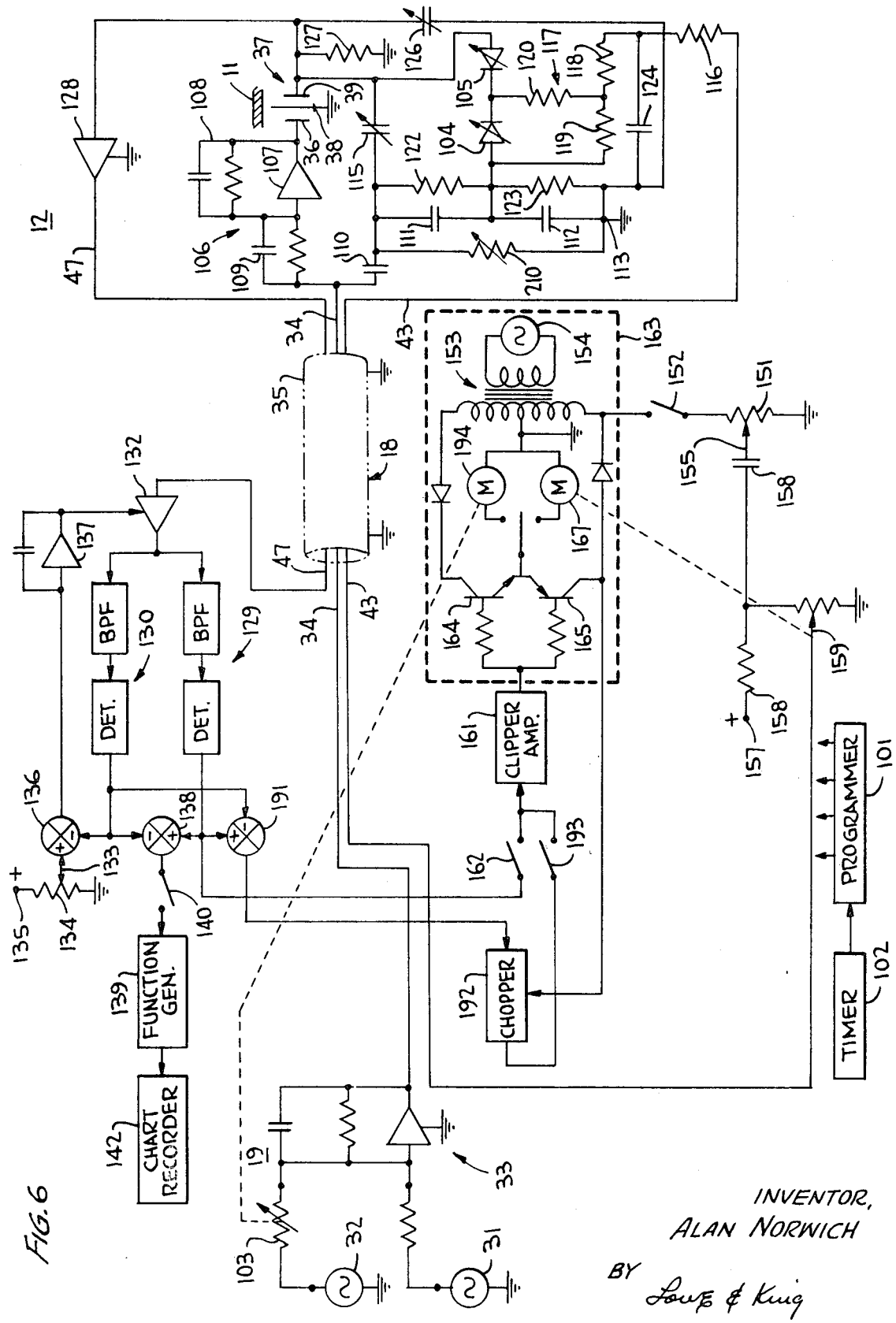
FIG. 6 is a circuit diagram of still another embodiment of the invention employing automatic balancing.

Reference is now made to FIG. 6 of the drawing wherein there is illustrated still another embodiment of the present invention. In the embodiment of FIG. 6, probe 37 at gauge station 12 is automatically balanced and standardized, preferably on a periodic basis in response to control signals derived from programmer 101 which is driven by timer 102. Programmer 101 and timer 102 are located at control station 19 which also includes high and low frequency AC sources 31 and 32 which drive capacitive probe 37 through lead 34 in cable 18. In the embodiment of FIG. 6, the amplitude of the high-frequency voltage is controlled by varying the value of resistor 103 connecting high-frequency source 31 to the input terminal of amplifier 33. The value of resistor 103 is adjusted during a standardization operation while a standardizing material, i.e., only air, is in the fringing field of capacitive probe 37 between electrodes 37 and 39. The value of resistor 103 is adjusted in a manner described infra so that the relative amplitude responses of detecting channels associated with voltage sources 31 and 32 are maintained constant despite changes due to drift in the electrical circuits of the detecting channels.

The equipment at gauge station 12 includes features common to concepts of the embodiments of FIGS. 3 and 4 as well as circuitry to substantially eliminate phase shifts caused by the large valued resistance feeding a DC control voltage to varactor diodes 104 and 105. In particular, gauge station 12 includes a phase inverting driver amplifier circuit 106 having a gain greater than 1, preferably on the order of 11, connected to drive capacitive probe 37 in response to AC voltages fed through cable 18 on lead 34. To this end, amplifier circuit 106 includes phase inverting, high gain operational amplifier 107 and feedback impedances 108 and 109 having a ratio of the relative values thereof of 11 to 1. To reduce the AC voltage applied to back-to-back varactor diodes 104 and 105, a capacitive voltage divider including capacitors 111 and 112 is connected to lead 34 by decoupling capacitor 110 on the gauge station 12 side of cable 35 and to ground terminal 113. To maintain phase balance at the frequency of low-frequency source 32, resistor 210 is connected between capacitor 110 and terminal 113.

Amplifier circuit 106, having a gain greater than unity, serves the same function as amplifier circuit 41, FIG. 3, that has a gain less than unity since the former amplifier is essentially in shunt with the varactor diodes 104 and 105 while the latter is in series with the varactor diodes. The combined effect of amplifier circuit 106 and the voltage divider comprising capacitors 111 and 112 is multiplicative. In the circuit of FIG. 6, varactor diodes 104 and 105 are of a type having a nominal value of 100 picofarads at 4 volts DC bias. The effective capacitive value of diodes 104 and 105 is reduced by approximately a factor of 100 due to the combined effects of amplifier circuit 106 and the voltage divider comprising capacitors 111 and 112. The relatively low amplitude AC voltage derived at the terminal between capacitors 111 and 112 is applied to the anode of varactor diode 104, having a cathode connected to the cathode of varactor diode 105. Diodes 104 and 105 are shunted by variable capacitor 115, having a value adjusted to be approximately 90 percent of the capacitance required for balancing capacitive probe 37. The remainder of the balancing capacitance for probe 37 is provided by voltage controlled, back-to-back varactor diodes 104 and 105. The parallel combination of capacitor 115 and back-to-back varactor diodes 104 and 105 form two legs of a bridge circuit the other legs of which comprise capacitive probe 37.

The capacitive values of varactor diodes 104 and 105 and capacitor 115 are adjusted so that the bridge is in a balanced condition while only air is in the fringing field between electrodes 36 and 39. A bridge balanced condition results in response to the AC voltage between electrode 39 and ground being zero while only air is in fringing field of probe 37. To achieve balance, the capacitances of varactor diodes 104 and 105 are adjusted in response to the amplitude of a DC voltage on lead 43, as coupled to the common cathodes of the diodes by RF decoupling resistor 116 and T-network 117. T-network 117 includes resistors 118 and 119, connected in series between one terminal of resistor 116 and the anode of diode 104. The common terminal of resistors 118 and 119 is connected to the common cathode terminal of varactor diodes 104 and 105 through resistor 120. Each of resistors 118-120 is of relatively large magnitude to decouple the DC voltage on lead 43 from the remainder of the elements in the circuit and establish the voltage required to bias diodes 104 and 105 to the value of capacity required to achieve balance. In one embodiment of the invention actually built and utilized, each of resistors 118 and 119 has a value of 1 megohm, while resistor 120 has a value of 3 megohms.

It is desirable to increase the values of the resistors in T-network 117 to an even larger effective value for AC to reduce the phaseshift introduced by the T-biasing network on the AC signal coupled through the varactor diode network, particularly at the low-frequency end of the operating range of the system, i.e., for the frequency of source 32. The circuit of the present invention enables the effective AC value of resistor 120 to be increased by reducing the AC voltage across the resistor 120 substantially to zero. Reducing the AC voltage across resistor 120 to substantially zero effectively removes the resistor from the AC circuit path. The AC voltage across resistor 120 is effectively reduced to zero by establishing AC ground potential at the junction of resistors 116 and 118, a result attained through the connection of capacitor 124 between the junction and ground terminal 113, and by selecting resistors 118 and 119 to have the same values. Since the impedances of varactor diodes 104 and 105 are approximately equal and the voltage at the anode of diode 105 is usually close to ground the AC voltage at the common cathode terminal of the varactors is approximately one-half the AC voltage at the anode of varactor 104. The AC voltage at the common terminal of resistors 118 and 119 is substantially equal to one-half the AC voltage at the anode of varactor 104 between resistors 118 and 119 have the same value and the junction between resistors 116 and 118 is at AC ground. Thereby, there is virtually a zero potential difference across resistor 120 and the effective value of resistor 120 is increased by a factor equal to the voltage at the common terminal of the cathodes of varactor diodes 104 and 105 divided by the voltage across resistor 120.

Further compensation for the low-frequency phase shift introduced by resistor 120 and varactor diode 104 is provided by connecting resistors 122 and 123 in shunt with capacitors 111 and 112, respectively. The values of resistors 122 and 123 are selected in inverse ratio to the values of capacitors 111 and 112; in a typical embodiment of the invention actually built, resistors 122 and 123 have values of 3 megohms and 3,000 kilohms, respectively.

The AC voltage derived from capacitor probe 37 and the balancing network including capacitor 115 and varactor diodes 104 and 105 is derived across a load including variable capacitor 126 and resistor 127. Capacitor 126 and resistor 127 are connected in parallel with each other for AC signal currents, with the capacitor and resistor both being driven by the output voltage of receiving electrode 39. Resistor 127 is connected directly to ground while capacitor 126 is connected to AC signal ground terminal 113. The value of capacitor 126 is adjusted on an a priori basis depending upon the material in the fringing field of capacitor probe 37 while the system is in normal.

The voltage developed across load capacitor 126 and resistor 127 is fed to impedance transforming amplifier 128. Amplifier 128 is constructed so that its input impedance matches the load of the probe 37 and its output impedance matches the load of lead 47 within cable 18.

The signal derived from the output of amplifier 128 is coupled via lead 47 through cable 18 to control station 19. At control station 19, the signal on lead 47 is applied through variable gain amplifier 132 to low and high-frequency detecting channels 129 and 130, respectively. The circuitry within channels 129 and 130 is substantially the same as that included in network 25, FIG. 2, and hence a description thereof is not repeated. The output of the low-frequency detecting channel 129, a DC or low-frequency voltage indicative of the amplitude of the signal component resulting from source 32, as derived at gauge station 12 on lead 47, is compared with a DC reference voltage derived from slider 133 of potentiometer 134 which is excited by a positive DC voltage at terminal 135. The difference voltage between the DC outputs of channel 129 and the voltage at slider 133 is derived by subtraction network 136, which feeds integrator 137, that in turn controls the gain of amplifier 132. Integrator 137 has a time constant appropriately selected to control the time constant of an AGC loop including amplifier 132 so that the AGC loop is stabilized to prevent oscillation.

The DC output voltages derived from channels 129 and 130, respectively indicative of the response of capacitor probe 37 to the components applied to the probe in response to sources 31 and 32, are linearly combined in subtracting node 138, the output of which is coupled to function generator 139 through switch 140 while the system is in normal operation monitoring the impedance properties of sheet 11. Switch 140 is maintained in a closed state in response to an output signal of programmer 101 while the system is in normal operation. While standardizing and balancing operations are being performed, however, switch 140 is open circuited in response to a command signal generated by programmer 101 and function generator 139 is thereby inoperative. The output of function generator 139 is coupled to a display means, such as chart recorder 142 to provide a visual indication of the moisture properties of sheet 11. The manner by which channels 129 and 130, in combination with variable gain amplifier 132 and function generator 139 determine the moisture properties of sheet 11 is well known in the art and need not be discussed further herein.

During a balancing operation, a relatively small, constant amplitude AC voltage modulates the response of the circuitry included at gauge station 12 by cyclically varying the capacitance of varactor diodes 104 and 105 at a frequency considerably displaced from the frequencies of sources 31 and 32, such as 60 Hertz. The phase of the 60 Hertz. modulation is compared with a reference phase to control the magnitude of the DC voltage on lead 43 automatically, thereby to vary the average values of the capacitances of varactor diodes 104 and 105 to achieve balance for capacitive probe 37. The signal for controlling balancing is derived by phase comparing the AC modulation imposed on the gauge station apparatus with a reference phase and varying the potential of the voltage applied to the varactor diodes 104 and 105 until balance is achieved.

To these ends, while only air is in the fringing field between electrodes 36 and 39 and programmer 101 is activated to cause a balancing operation to be performed, an AC voltage is applied between the ends of potentiometer 151. The AC voltage is applied to one terminal of potentiometer 151 through switch 152, closed in response to a control signal derived from programmer 101 while the system is undergoing balancing. The AC voltage applied to potentiometer 151 is derived between one end of the secondary winding of center tapped transformer 153 and the grounded center tap of the secondary. The primary winding of transformer 153 is driven by a convenient AC source 154, which is preferably a 60 Hertz line source.

The AC voltage developed at slider 155 of potentiometer 151 is fed to potentiometer 156 through DC coupling capacitor 158. A DC voltage is supplied to potentiometer 156 from a positive voltage source connected to terminal 157 and fed to the potentiometer through resistor 158. The AC and DC voltages developed at slider 159 of potentiometer 156 are fed through lead 43 of cable 18 to T-network 117. The value of capacitor 124 is selected so that the impedance thereof to the AC voltage is substantially an open circuit. The DC voltage fed by lead 43 to T-network 117 controls the average capacitance values of varactor diodes 104 and 105, while the AC component on lead 43 cyclically varies the capacitance of the diodes to amplitude and phase modulate the high and low-frequency components applied to station 12 via lead 34. Amplitude and phase modulation by the 60 Hertz voltage on lead 43 of the high and low-frequency components occurs in response to the capacitive variations of varactor diodes 104 and 105 in response to the 60 Hertz component. The modulation process is such that the high and low-frequency voltages developed across load capacitor 126 and load resistor 127 have 60 Hertz envelopes of variable amplitude and phase, depending upon the condition of balance between capacitive probe 37 and the balancing network including varactor diodes 104 and 105 and capacitor 115.

The variable amplitude and phase signal developed across load capacitor 126 and load resistor 127 is fed back to control station 19 via lead 47 through cable 18. The 60 Hertz envelope on the high-frequency signal is amplitude detected in channel 129, the output of which feeds clipper 161 through switch 162 during the balancing operation. Switch 162 is controlled in response to a command signal derived by programmer 101 so that it is open circuited except while the balancing operation is being performed.

The constant amplitude, variable phase output of clipper 161 is fed to synchronous, full wave, phase detector 163. Detector 163 includes opposite conductivity-type transistors 164 and 165, the bases of which are responsive to the output of clipper 161. The collectors of transistors 164 and 165 are driven in out of phase relationship in response to connections thereto from the opposite terminals of the secondary winding of transformer 153. The emitters of transistors 164 and 165 have a common connection and during the balancing operation are connected via switch 166 to DC motor 167. Switch 166 is controlled in response to the output of programmer 101 and is normally open circuited, but is activated to couple the voltage at the common connection of the emitters of transistors 164 and 165 to one terminal of the armature of motor 167. The other terminal of the armature of motor 167 is connected to the grounded center tap of the secondary winding of transformer 153.

Motor 167 responds to the phase difference between the reference AC voltage applied to the secondary winding of transformer 153 and the envelope of the high-frequency carrier developed across load impedances 126 and 127, as coupled through clipper 161, to drive the slider 159 of potentiometer 156. In response to the output of clipper 161 being of identical phase with the reference voltage applied to the secondary winding of transformer 153, a balanced condition exists between the capacitance of probe 37 with only air in the fringing field thereof and the capacitance of capacitor 115 and varactor diodes 104 and 105.

Figure 7:
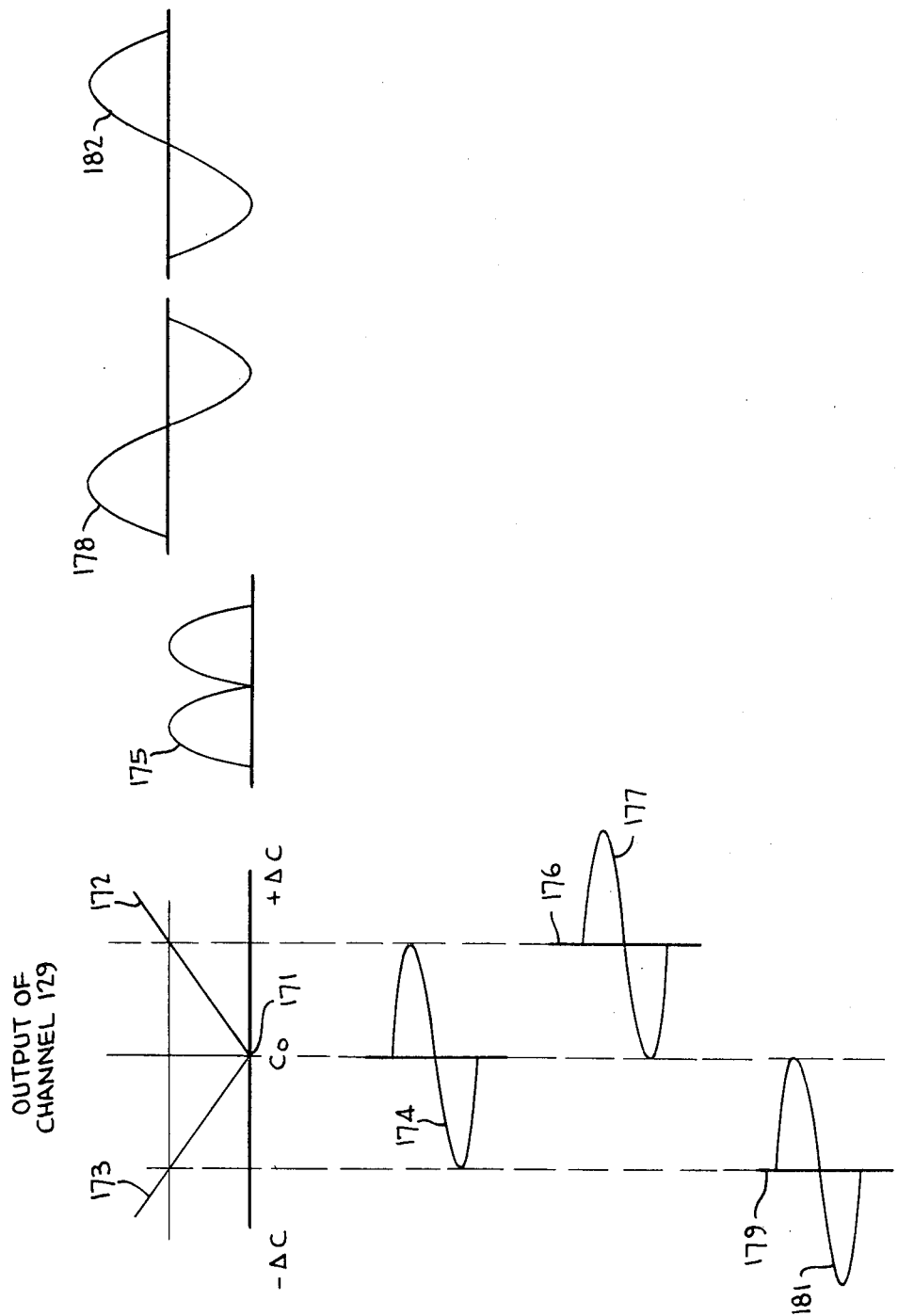
FIG. 7 contains curves useful in describing the embodiment of FIG. 6.

To provide a more complete understanding as to the manner by which automatic balancing of probe 37 is accomplished, reference is now made to FIG. 7 of the drawing. In FIG. 7, the output voltage of high-frequency detecting channel 129 is plotted as a function of the imbalance between capacitive probe 37 and the balancing network including capacitor 115 and varactor diodes 104 and 105. For a balanced condition, the AC voltage developed across load impedances 126 and 127 is zero, as indicated by point 171 on FIG. 7. For capacitive imbalances in both the positive and negative directions, the output of high-frequency detecting channel 130 increases in a positive, linear manner, as indicated by lines 172 and 173.

The AC voltage applied to the balancing network via lead 43 modulates the capacitances of varactor diodes 104 and 105 and thereby achieves a periodic variation in the output voltage across load impedances 126 and 127. If the capacitance of probe 37 is balanced exactly by the network including capacitor 115 and varactor diodes 104 and 105, the capacitance of the network is varied about point 171. In such an instance, the value of the capacitance of the entire gauge network, i.e., the net capacitance of probe 37 in combination with the network including capacitor 115 and varactor diodes 104 and 105, can be represented by sinusoid 174, having an average value coincident with the capacitive value at point 171. The capacitive variations indicated by waveform 174 are transformed into a full wave rectified output voltage by high-frequency detecting channel 130. as indicated by waveform 175. The two peaks of waveform 175 have identical amplitudes because of the equal positive and negative excursions of the net capacitance of the network about the balance value at point 171. In response to the equal amplitudes of the two peaks of w waveforms 175, transistors 164 and 165 are activated for the same time periods and motor 167 remains stationary, whereby the DC voltage at slider 159 of potentiometer 156 is not changed and the average capacitive values of varactor diodes 104 and 105 are maintained constant.

If an unbalance occurs between capacitive probe 37 and the network including capacitor 115 and varactor diodes 104 and 105 because of changes in temperature, humidity and/or the accumulation of dirt on the electrodes of probe 37 the net capacitance of the network shifts to a different value. For a positive capacitance imbalance, the net capacitance is assumed, for purposes of example, to be translated to a value coincident with line 176 in FIG. 7. In response to the 60 Hertz AC voltage applied to gauge station 12 on lead 43, the net capacitance developed across load impedances 126 and 127 varies as shown by waveform 177. The capacitance variations indicated by waveform 177 are detected by high-frequency detecting network 130 which derives AC waveform 178 in response thereto. A clipped version of detected 60 Hertz wave form 178 is compared with the reference sinusoid applied by transformer 153 to transistors 164 and 165. In response to a clipped version of wave form 178 and the reference AC voltage applied to the collectors of transistors 164 and 165, only transistor 165 conducts and transistor 164 is cut off, whereby motor 167 is driven in a direction to reduce the voltage applied to varactor diodes 104 and 105 until balance is achieved.

Next assume that the net capacitance of probe 37 and the network including capacitance 115 and varactor diodes 104 and 105 is less than the balance value by an amount indicated by line 179. In response to the AC voltage on lead 43, the net capacitance of the network including probe 37 and the balancing circuit therefore is varied in a sinusoidal manner as indicated by waveform 181. In response to the sinusoidal capacitance variations indicated by waveform 181, a sinusoidal, 60 Hertz waveform 182 is derived from high-frequency detecting channel 129. It is noted that waveform 182 is phase inverted 180° relative to waveform 178. In response to waveform 182 being applied to transistors 164 and 165 of synchronous detector 163, transistor 164 is rendered conductive, while transistor 165 is cut off. Thereby, motor 167 is driven in the opposite direction from the direction it was driven in response to detecting channel 129 deriving waveform 178. In response to rotation of motor 167 due to waveform 182 being applied to synchronous detector 163, the voltage at the tap 159 of potentiometer 156 is decreased to increase the capacitance of varactor diodes 104 and 105 until balance is achieved.

Either prior of subsequent to the balancing operation being performed, the gauge is standardized by adjusting the high- and low-frequency responses of the two detecting channels to be equal. These channels have a tendency to drift because the precision components included therein have a tendency to change as a function of ambient conditions. To achieve standardization and adjust the gains of the low- and high-frequency channels 129 and 130 to be the same, the relative amplitudes of the outputs of the two channels are compared while only air is in the fringing field of capacitive probe 37. In response to a comparison of the responses of channels 129 and 130, the amplitude of the high-frequency voltage being fed to lead 34 is controlled.

The responses of low- and high-frequency detecting channels 129 and 130 are derived by feeding the DC output voltages of the two channels to a difference node 191. The difference signal derived from node 191 is fed to AC chopper 192 driven by the same AC voltage as is applied to potentiometer 151 during the balancing operation. The resultant, 60 Hertz output of chopper 192 is coupled to clipper 161 through switch 193 while the system is in the standardizing operation. To this end, switch 193 is activated to the closed condition in response to an output signal of programmer 101.

The AC variable amplitude output of chopper 192 is fed to clipper 161 which drives synchronous rectifier 163 in the same manner as described supra during the balancing operation. The variable phase of the output of chopper 192 is compared with the phase of the reference voltage developed across the secondary winding of transformer 153 of synchronous rectifier 163 in the same manner as the phase of the output of high-frequency detecting channel 129 is compared during the balancing operation. During the standardizing operation, however, switch 166 is activated in response to a control signal derived by programmer 101 whereby the common emitter connection of transistors 164 and 165 drives one terminal of the armature of DC motor 194, the other terminal of which is connected to the grounded center tap of the secondary of transformer 153. In response to an imbalance between the responses of low and high-frequency detecting channels 129 and 130, motor 194 is activated in precisely the same manner as motor 167 was activated. The shaft of motor 194 drives variable resistor 103 which couples high-frequency source 32 to amplifier 33 to vary the amplitude of the high-frequency voltage applied to the network and thereby control the relative gains of the high- and low-frequency detecting networks.

After gauging station 12 has been standardized and balanced, programmer 101 is activated by timer 102 so that sheet 11 is again brought within the fringing field of probe 37 and the various switches are activated by the programmer to enable the impedance properties of the sheet to be monitored and read from chart recorder 142. To this end, slider 159 of potentiometer 156 and the tap of resistor 103 remain in situ during the measuring operation at the same positions as during the balancing and standardizing operations. Thereby, the DC voltage applied by the lead 43 to varactor diodes 104 and 105 is maintained at the value which resulted in the balance of the capacitive probe and the voltage amplitude of high frequency source 32 is stabilized at the same amplitude as was reached during standardization while the moisture properties of sheet 11 are monitored. While the properties of sheet 11 are being monitored, finite, nonzero output voltages are derived across load impedances 126 and 127 at the low and high frequencies of sources 31 and 32. These voltages are detected by channels 129 and 130 to drive recorder 142.

While I have described and illustrated several specific embodiments of my invention, it will be clear that variations of the details of construction which are specifically illustrated and described may be made without departing from the true spirit and scope of the invention. For example, a single AC source and a simpler detector circuit can be utilized in place of the two frequency source and detector system shown in a system wherein only balancing is performed.

I claim:

1. A system for measuring impedance properties of a sample comprising a measuring station located at the sample site, said measuring station including: a capacitive probe adapted to be coupled to said sample for deriving a signal indicative of the sample impedance properties, and balancing circuit means including a voltage controlled variable semiconductor capacitor connected in circuit with said probe; a control station remotely located from said measuring station, said control station including: a source of AC power for energizing said probe, means for monitoring signals derived from said prone and balancing circuit, and a variable DC power source for controlling the value of said semiconductor capacitor; and transmission means interconnecting said stations for: coupling said AC power source and monitoring means with said measuring station, said monitoring means being coupled to said probe and balancing circuit, and for establishing a DC path for said DC power source to said semiconductor capacitor to variably back bias the same; said measuring station further including means energized by said AC power source for deriving a pair of out-of-phase AC voltages, means for connecting said capacitive probe and said balancing circuit means in series circuit to be driven by said out-of-phase AC voltages and means for changing the effective capacitive value of said semiconductor capacitor to approximately the capacity of said probe when said probe is loaded only by air.

2. The system of claim 1 wherein said effective capacitive value changing means includes: a first capacitor having one side coupled to said AC voltage deriving means to be responsive to one of said out-of-phase voltages, a tapped capacitive voltage divider for dividing the said out-of-phase voltages, and means connecting said semiconductor capacitor between the tap of said divider and the other side of said first capacitor.

3. The system of claim 1 wherein said effective capacitive value changing means comprises an amplifier having a gain less than one, said amplifier being connected to feed AC voltage from said source to said balancing circuit means including said semiconductor capacitor.

4. The system of claim 3 wherein said amplifier comprises polarity inverting means for providing one of said out-of-phase voltages.

5. The system of claim 3 wherein said semiconductor capacitor comprises a pair of variable capacitor diodes connected in series back-to-back relation between the output of said amplifier and said probe, and means connecting both said diodes to be back biased by the voltage of said DC source.

6. The system of claim 1 wherein said semiconductor capacitor comprises a pair of variable capacitor diodes connected back-to-back in a series circuit energized by one of said out-of-phase voltages and coupled to said probe, and means connecting both said diodes to be back biased by the voltage of said DC source.

7. The system of claim 1 wherein said effective capacitive value changing means comprises means for changing the relative amplitudes of the out-of-phase voltages applied to said probe and balancing circuit means, whereby different amplitude out-of-phase AC voltages are applied to said probe and balancing circuit means.

8. The system of claim 1 wherein said means for deriving a pair of out-of-phase AC voltages includes phase inverting means comprising a transformer having a grounded center tapped secondary winding, opposite ends of said winding being connected to energize said probe and said balancing circuit means.

9. The system of claim 8 wherein said probe includes spaced transmitting and receiving electrodes having a grounded shield between them, whereby a relatively fixed capacity is established between said transmitting electrode and shield, said transmitting electrode being connected to be driven by one end of said secondary winding, and a capacitor connected between the other end of said winding an ground, said capacitor having a value approximately equal to said relatively fixed capacity to provide balanced out-of-phase voltage at the opposite ends of said secondary winding.

10. The system of claim 9 further including a tapped capacitive voltage divider shunting said capacitor connected between said other end of said winding and ground, a further capacitor connected in series circuit with said other end of said winding and said receiving electrode, and means connecting said semiconductor capacitor between the tap of said divider and ground.

11. A head for monitoring the admittance of a sample responsive to a first AC voltage from a source thereof at a remote location and for feeding an admittance indicating signal to a remote location comprising a first input terminal for a DC voltage source at the remote location, a second input terminal for said AC voltage, means connected to said second input terminal for phase inverting the AC voltage thereby to provide a source of a second AC voltage which is out of phase with said first AC voltage, a capacitive probe including a receiving electrode and a transmitting electrode, a varactor diode including anode and cathode electrodes, means connecting said probe electrodes and said varactor diode electrodes in series circuit with each other and with said AC voltage sources to be driven by said out-of-phase voltages, and means connecting said diode to said first input terminal to be back biased by the DC voltage source, wherein said probe includes a grounded shield electrode between said receiving and transmitting electrodes, whereby the capacity between said receiving and transmitting electrodes is on the order of 1 picofarad and the nominal capacity of said varactor diode is greater than 1 picofarad, and wherein said head includes means for changing the effective capacity of said varactor diode to approximately 1 picofarad.

12. The head of claim 11 wherein said effective capacity value changing means includes: a first capacitor having one side coupled to one of said sources of out-of-phase voltages, a tapped capacitive voltage divider for the out-of-phase voltage provided by said one source, and means connecting said varactor diode between the tap of said divider and the other side of said first capacitor.

13. The head of claim 11 wherein said effective capacitive changing means includes an amplifier having a gain less than one, said amplifier being connected to feed one of said out-of-phase voltages to said varactor diode.

14. The head of claim 13 wherein said amplifier comprises said polarity inverting means.

15. The head of claim 13 further including a second varactor diode, said varactor diodes being connected in series back-to-back relation between the output of said amplifier and said receiving electrode, and means connecting both said diodes to be back biased by the DC voltage at said first input terminal.

16. The head of claim 11 further including a second varactor diode, said varactor diodes being connected in series back-to-back relation between one of said sources of out-of-phase voltages and said receiving electrode, and means connecting both said diodes to be back biased by the DC voltage at said first input terminal.

17. The head of claim 11 wherein said effective capacitive changing means comprises means for changing the relative amplitudes of the out-of-phase voltages applied to said transmitting electrode and one of the electrodes of the varactor.

18. The head of claim 11 wherein said phase-inverting means comprises a transformer having a grounded center tapped secondary windings, opposite ends of said windings being connected to drive said transmitter electrode and one electrode of said varactor diode.

19. The head of claim 18 wherein said probe includes a grounded shield between said receiving and transmitting electrodes whereby a relatively fixed capacity is established between said transmitting electrode and shield, said transmitting electrode being connected to be driven by one end of said secondary winding, and a capacitor connected between the other end of said winding and ground, said capacitor having a value approximately equal to said relatively fixed capacity to provide balanced out-of-phase voltages at the opposite ends of said secondary winding.

20. The head of claim 19 further including a tapped capacitive voltage divider shunting said capacitor connected between said other end of said winding and ground, a further capacitor connected in series circuit with said other end of said winding and said receiving electrode, and means connecting said varactor diode between the tap of said divider and said receiving electrode.

21. The head of claim 11 further including means for amplifying the AC voltage at said receiving electrode.

22. In combination with a system for determining a property of a dielectric material at a measuring station including a capacitive probe having spaced electrodes adapted to be placed adjacent said material and electrically coupled thereto, capacitive balancing circuit means, means for energizing said probe and said balancing circuit means with oppositely phased alternating voltages, means coupled to said probe and to said balancing circuit means for producing a signal having a first component dependent on the capacitance of said balancing circuit means and a second component dependent on the capacitance of said probe, and means for relatively displacing said probe from said material to electrically decouple said probe therefrom, the improvement comprising a DC voltage source for producing a DC voltage,
a voltage controlled capacitive circuit element included in said balancing circuit means and responsive to said DC voltage to vary the capacitance of the capacitive circuit element in accordance with the value of said DC voltage,
circuit means cooperating with said voltage controlled capacitive circuit element for proportioning said second signal component to make its value approximately equal to the value of said first signal component while said probe is electrically decoupled from said material,
means for adjusting said DC voltage to a value such that said second signal component is made precisely equal to said first signal component when said probe is relatively displaced from said material to electrically decouple said probe therefrom and for maintaining said adjusted DC voltage value when said probe is again located adjacent to said material, and
means utilizing the difference between said first and second signal components while said probe is located adjacent to said material and while said adjusted DC voltage is maintained to determine said material property.

23. The method of determining a property of a dielectric material utilizing a gauge having a capacitive probe and balancing circuit means each energized with an alternating voltage, said probe having a pair of spaced electrodes adapted to be placed adjacent said material and electrically coupled thereto, said gauge including means coupled to said probe and to said balancing circuit means for producing a signal having a first component dependent on the impedance of said probe and a second component dependent on said balancing circuit means, said balancing circuit means including a voltage controlled capacitive circuit element responsive to a DC voltage, said method comprising the steps of relatively separating said probe and said material to electrically decouple said electrodes from said material,
comparing said first and second components and adjusting said DC voltage to a value such that said components are equalized,
relatively moving said probe and said material into proximity so as to again electrically couple said electrodes to said material and
while maintaining said adjusted DC voltage value, utilizing the difference between said signal components to determine said value of said material property.

24. In combination, a gauge including a probe and a balancing circuit for the probe, said probe being responsive to property variations of a material in an energy field derived from the probe while a measurement of a property of the material is being performed, means for connecting said probe and balancing circuit together and to a voltage source so that an output signal is derived from the gauge indicative of the relative admittances of the probe and balancing circuit, means for adjusting the admittance of the balancing circuit so that a zero voltage is derived from the gauge while a reference material is in said energy field during a balancing operation and a finite, nonzero voltage is derived from the gauge while a sample having characteristics of the property different from the reference material is in said energy field during a measuring operation, said means for adjusting including: means for periodically modulating the admittance of the balancing circuit during the balancing operation whereby the gauge output signal is correspondingly modulated, means for sensing the modulated gauge output signal to derive an indication of the difference between the probe and balancing circuit admittances during the balancing operation, and means responsive to said indication for controlling the average admittance of the balancing circuit so that a zero voltage is derived from the gauge while the admittance is not modulated and the reference material is in the field and for maintaining the admittance of the balancing circuit substantially at the value which resulted in the zero voltage being derived from the gauge during the balancing operation while the measuring operation is being performed.

25. The combination of claim 24 including a source of reference voltage having the same frequency as the frequency of the modulating means, wherein said sensing means includes a synchronous phase detector responsive to the modulated gauge output signal and said reference voltage.

26. The combination of claim 25 wherein the balancing circuit includes a voltage-controlled admittance, said modulating means including an AC source connected to control the admittance of said voltage-controlled admittance, said admittance controlling means including: a DC source connected to control the admittance of said voltage-controlled admittance, and means for controlling the magnitude of the DC source in response to said phase detector.

27. The combination of claim 26 wherein the means for controlling the magnitude of the DC source includes a voltage divider having a tap constituting the output of said DC source, and a DC motor driving said tap said motor being responsive to a DC voltage derived from said phase detector.

28. The combination of claim 24 wherein said probe balancing circuit includes a pair of back-to-back series connected voltage responsive variable capacitor semiconductor diodes, a network for applying a capacitive voltage control biasing voltage to said diodes to effectively increase the AC impedance of the biasing network to said voltage source.

29. A gauge circuit for enabling impedance properties of a material to be measured comprising a capacitive probe having first and second electrodes for applying electrostatic energy to the material, a terminal for supplying AC voltage, a balancing circuit connected in shunt with the electrodes of said probe, a load impedance connected to one electrode of said probe, a phase inverting amplifier connected between said terminal and the other electrode of said probe, said amplifier having a predetermined gain greater than unity, a capacitive voltage divider connected between said terminal and ground, said divider having a tap whereon the amplitude of the AC voltage applied to the terminal is reduced by the reciprocal of the gain of the amplifier, said balancing circuit including capacitive means responsive to the AC voltage derived at said tap and feeding AC current to said load impedance in phase opposition to the AC current fed to the load by the probe and amplifier.

30. The circuit of claim 29 wherein said balancing circuit includes a first capacitor connected in parallel with a voltage-controlled capacitor, said first capacitor having a value substantially equal to but slightly less than the capacitance between said electrodes while only air is in the field between the electrodes, and means for applying a DC voltage to the voltage controlled capacitor to enable the AC voltage across the load to be substantially zero while only air is in the field between the electrodes.

31. The circuit of claim 30 wherein said voltage-controlled capacitor comprises a pair of back-to-back diodes, said diodes being voltage-controlled variable capacitances.

32. The circuit of claim 31 further including means for applying a biasing voltage to a common terminal of said diodes, said biasing applying means including a resistive voltage divider having a tap and one terminal connected to the tap of the capacitive voltage divider, another terminal of the resistive voltage divider being responsive to a terminal adapted to be connected to a voltage source controlling the capacitance of the diodes, capacitor means shunting said last named terminal to ground to provide substantially a short circuit for frequencies of the AC source and substantially an open circuit for frequencies of the controlling voltage source, and a resistor connected between the tap of the resistive voltage divider and a common terminal of said diodes.

33. The circuit of claim 32 wherein the impedances of said resistive voltage divider between the tap thereof and each of the terminals thereof are approximately equal.

34. The circuit of claim 33 further including another resistive voltage divider in shunt with the capacitive voltage divider and having a tap short circuited to the tap of the capacitive voltage divider, the impedances of the elements of the another resistive voltage divider being in the same proportion as the impedances of the elements of the capacitive voltage divider.

35. A system for balancing and standardizing a dual frequency admittance gauge for monitoring properties of a material comprising a source of first and second displaced AC frequencies, a probe responsive to both said frequencies of said source for applying a field to a material being monitored, means responsive to the response of said probe to both said frequencies for deriving first and second signals having amplitudes respectively indicative of the response of the probe to said first and second frequencies, means responsive to the relative amplitudes of said first and second signals while only a reference material is in the field derived by the probe for adjusting the relative responses of channels associated with the first and second frequencies to be substantially the same, means responsive to one of said signals while only the reference material is in the field derived by the probe for balancing the response of the probe, and means responsive to both said signals while a material being monitored is in the field of the probe for deriving an indication of the properties of the material being monitored.

36. The system of claim 35 wherein said means for balancing includes means for cyclically modulating an impedance of the gauge at a predetermined frequency displaced from both frequencies of said source, and said means for adjusting includes: means for deriving a difference signal indicative of the difference between the relative amplitudes of said first and second signals, and means for chopping the difference signal at said predetermined frequency; a synchronous phase detector, programmer means for sequentially feeding to the phase detector (a) the chopped difference signal and (b) said one of said signals while the impedance of the gauge is being modulated.

37. The system of claim 36 further including a DC motor means responsive to the phase detector for varying the relative amplitude of the voltages at said frequencies applied by said source to said probe while the chopped difference signal is being fed to the phase detector and for varying the average value of the gauge impedance while the impedance of the gauges is being modulated.

38. A method of balancing and standardizing an admittance gauge for monitoring properties of a material, said gauge being driven by a source of displaced first and second frequencies and including a probe responsive to the frequencies, a balancing circuit connected to shunt with the probe, and means for detecting the amplitude of the probe response to both said frequencies, said method comprising the steps of adjusting the relative responses of detecting channels associated with both said frequencies to be equal while only a reference material is in a field derived by the probe, modulating the balancing circuit impedance while only a reference material is in the field derived by the probe at a time while the relative responses of the detecting channels are not being adjusted, adjusting the average value of the impedance of the balancing circuit in response to the modulation imposed on the balancing circuit impedance so that the probe and balancing circuit impedances are balanced, while a material being monitored for admittance properties is in the field of the probe, maintaining the responses of the detecting channels and the average value of the balancing impedance constant at levels achieved while only the standard material is in the field of the probe, and deriving an indication of the admittance properties in response to signals derived from said detecting means.

39. A method of balancing an admittance gauge for monitoring properties of a material, said gauge including a probe driven by an AC source and a balancing circuit connected in shunt with the probe, said method comprising the steps of modulating the balancing circuit impedance while only a reference material is in the field derived by the probe, adjusting the average value of the impedance of the balancing circuit in response to the modulation imposed on the balancing circuit so that the probe and balancing circuit impedances are balanced, while a material being monitored for admittance properties is in the field of the probe, maintaining the average value of the balancing impedance constant at a level achieved while only the standard material is in the field of the probe, and deriving an indication of the admittance properties in response to a signal derived from the probe and balancing circuit while the material being monitored for admittance properties is in the field of the probe.

40. In combination with a system for determining an admittance property of a material at a measuring station including a probe for coupling a field to said material, balancing circuit means connected in shunt with said probe, means for energizing said probe and said balancing circuit means with oppositely phased alternating voltages, means coupled to said probe and to said balancing circuit means for deriving a signal having a first component indicative of the admittance of said balancing circuit means and a second component indicative of the admittance of said probe, a voltage controlled impedance element included in said balancing circuit means, a control voltage source having a frequency displaced from the frequency of the means energizing the probe and balancing circuit and controlling the impedance of the voltage-controlled impedance, means for adjusting the value of the voltage-controlled impedance in response to the control voltage source for proportioning said second signal component to make the value thereof approximately equal to the value of said first said signal component while said probe is loaded only with a standard material, means for maintaining the value of the voltage-controlled impedance at the value achieved while the standard material is in the field of the probe, and means responsive to the difference between said first and second signal components while a material to be monitored for admittance variations is in the field of the probe.

41. A method of determining a property of a material utilizing a gauge having a probe and balancing circuit means, said probe and balancing circuit means both being energized with an alternating voltage, said probe including means for applying a field to a material to be monitored, said gauge including means coupled to said probe and to said balancing circuit means for deriving a signal having a first component indicative of the impedance of said probe and a second component indicative of the impedance of said balancing circuit means, said balancing circuit means including a voltage-controlled impedance element responsive to a control voltage source, said method comprising the steps of comparing said first and second components and adjusting the magnitude of the control voltage source to a value such that said components are substantially the same while a standard material is in the field of the probe, and while maintaining the impedance of the voltage controlled impedance at the same value as was achieved during the last-named step deriving an indication of the difference between said signal components while a material being monitored for impedance properties is in the field of the probe.

* * * * *